(12) United States Patent
Tarantino et al.

(10) Patent No.: US 8,668,171 B2
(45) Date of Patent: Mar. 11, 2014

(54) UTENSIL REST

(75) Inventors: Jay Tarantino, Marion, OH (US);
Jeanine Tarantino, Marion, OH (US);
William P. Camp, Jr., Vanlue, OH (US)

(73) Assignee: Ivan Mudd LLC, Marion, OH (US)

( * ) Notice: Subject to any disclaimer, the term of this patent is extended or adjusted under 35 U.S.C. 154(b) by 0 days.

(21) Appl. No.: 13/495,154

(22) Filed: Jun. 13, 2012

(65) Prior Publication Data
US 2013/0037660 A1  Feb. 14, 2013

Related U.S. Application Data

(60) Provisional application No. 61/521,165, filed on Aug. 8, 2011.

(51) Int. Cl.
*A47G 21/14* (2006.01)

(52) U.S. Cl.
USPC ....... 248/37.3; 248/37.6; 220/500; 40/642.02

(58) Field of Classification Search
USPC ............. 248/37.3, 37.6; 211/70.7, 13.1, 70.6, 211/85.4; 220/500, 566; 206/553, 459, 232; 40/642.02, 299.01
See application file for complete search history.

(56) References Cited

U.S. PATENT DOCUMENTS

| | | | |
|---|---|---|---|
| 1,182,732 A | 5/1916 | Avery | |
| 1,615,030 A * | 1/1927 | Nock | 206/553 |
| 1,666,668 A * | 4/1928 | Purchas | 206/762 |
| 1,715,048 A * | 5/1929 | Townsend | 206/102 |
| 2,374,442 A * | 4/1945 | Lulham | 131/256 |
| 2,511,542 A * | 6/1950 | Rau | 206/553 |
| 2,639,081 A * | 5/1953 | Metzger | 206/488 |
| 2,664,005 A * | 12/1953 | Kosinski | 211/70.1 |
| 2,807,361 A * | 9/1957 | Junkin | 206/553 |
| 2,980,241 A * | 4/1961 | Howell, Jr. et al. | 206/565 |
| 3,002,630 A * | 10/1961 | Heisser | 211/65 |
| 3,263,820 A * | 8/1966 | McFadden et al. | 211/60.1 |
| 3,685,660 A * | 8/1972 | Saunders | 211/70.1 |
| 3,915,213 A * | 10/1975 | Graham, Jr. | 206/553 |
| 3,937,389 A * | 2/1976 | Wind | 229/406 |
| 4,770,379 A * | 9/1988 | Estvold | 248/110 |
| 4,834,328 A * | 5/1989 | Hall | 248/37.3 |
| 4,858,863 A * | 8/1989 | Lin | 248/174 |
| 4,905,947 A * | 3/1990 | Henne et al. | 248/174 |
| 4,940,199 A * | 7/1990 | Hall | 248/37.3 |
| 4,979,610 A * | 12/1990 | Thomas | 206/749 |
| 4,995,515 A * | 2/1991 | Smith | 211/65 |
| D320,332 S | 10/1991 | Fetty | |
| 5,127,616 A * | 7/1992 | Carney | 248/176.2 |
| 5,411,141 A * | 5/1995 | Bounds | 206/553 |
| D408,229 S | 4/1999 | Hong | |
| 5,938,068 A * | 8/1999 | Atkins et al. | 220/839 |
| 6,273,278 B1 * | 8/2001 | Enyedy et al. | 211/85.4 |
| 6,412,653 B1 * | 7/2002 | Waterhouse | 220/556 |
| 6,581,774 B1 * | 6/2003 | Galafassi et al. | 206/553 |

(Continued)

*Primary Examiner* — Nkeisha Smith
(74) *Attorney, Agent, or Firm* — Fraser Clemens Martin & Miller LLC; Jacob M. Ward

(57) ABSTRACT

A utensil rest includes a main body having a first sidewall and a second sidewall. The first sidewall and the second sidewall are connected and define an edge of the main body. At least one of the first sidewall and the second sidewall have at least one utensil receiving portion formed therein. The at least one utensil receiving portion is configured to receive a utensil.

6 Claims, 13 Drawing Sheets

(56) References Cited

U.S. PATENT DOCUMENTS

| | | |
|---|---|---|
| 6,604,714 B1 * | 8/2003 | Hall .............................. 248/37.3 |
| 6,994,304 B2 | 2/2006 | Kim et al. |
| 7,266,865 B1 | 9/2007 | Rodin |
| 7,975,857 B2 | 7/2011 | Restis et al. |
| D665,232 S * | 8/2012 | O'Connell et al. ............ D7/637 |
| D675,065 S * | 1/2013 | Tarantino et al. .............. D7/601 |
| 2002/0158031 A1 * | 10/2002 | Powers ....................... 211/41.11 |
| 2008/0060559 A1 * | 3/2008 | Holland-Hinrichs ........... 108/28 |
| 2011/0114533 A1 | 5/2011 | Le |
| 2013/0087664 A1 * | 4/2013 | Weavel ........................ 248/37.3 |

* cited by examiner

UTENSIL REST

CROSS-REFERENCE TO RELATED APPLICATIONS

This application claims the benefit of U.S. Provisional Application No. 61/521,165, filed on Aug. 8, 2011. The entire disclosure of the above application is hereby incorporated herein by reference.

FIELD OF THE INVENTION

The present invention relates generally to utensil rests and, more particularly, to utensil rests that support eating utensils and keep the eating utensils sanitary and spaced apart from one another.

BACKGROUND OF THE INVENTION

A common practice in restaurants and homes is to allow eating utensils, such as a knife, a fork, a spoon, and chopsticks to make direct contact with eating surfaces such as a table top before and during a meal. The common practice can be unsanitary because table tops, particularly in restaurants, often contain bacteria and can be unclean, especially since used utensils can soil the eating surface.

Known utensil rests are described and otherwise shown in the following patents: U.S. Pat. Nos. 6,604,714 to Hall; 6,994,304 to Kim et al.; 7,266,865 to Rodin; 7,975,857 to Restis et al.; D320,332 to Fetty; and D408,229 to Hong. The entire disclosures of the aforementioned patents are hereby incorporated herein by reference.

It is believed that people are reluctant to lay their utensils on table tops, especially after initial use, which is a primary reason that people rest their utensils on plates, sugar packs or each other. There is a strong desire by the general public, hospitals, nursing homes, assisted living facilities, and restaurants to keep utensils clean, especially in the home and at special events. There is also a desire by restaurant supply houses, direct distributors, retailers, Internet stores, fund raising programs, and incentive programs, to have new forms of advertising.

There is a continuing need for a utensil rest for supporting a neck of a utensil above an eating surface such as a table. Desirably, the utensil rest readily receives a business card or other advertisement, and has means for holding the business card or other advertisement.

SUMMARY OF THE INVENTION

In concordance with the instant disclosure, a utensil rest for supporting a neck of a utensil above an eating surface such as a table, which may readily receive a business card or other advertisement, and which may have means for holding the business card or other advertisement, is surprisingly discovered.

In one embodiment, a utensil rest includes a main body having a first sidewall and a second sidewall. The first sidewall and the second sidewall are connected and define an edge of the main body. At least one of the first sidewall and the second sidewall have at least one utensil receiving portion formed therein. The at least one utensil receiving portion is configured to support a utensil.

In another embodiment, the main body of the utensil rest is substantially V-shaped in cross-section. The at least one utensil receiving portion includes at least one recess. The at least one recess includes a first recess, a second recess, and a third recess spaced apart along the edge of the main body. The second recess is disposed between the first recess and the third recess. The first recess and the third recess have a first recess length. The second recess has a second recess length. The second recess length is greater than the first recess length. Each of the first sidewall and the second sidewall also has a base with a base length. The edge has an edge length. The base length is greater than the edge length.

In a further embodiment, one of the first sidewall and the second sidewall includes a tray. The tray has a bottom portion and a pair of side portions. The bottom portion is connected to the one of the first sidewall and the second sidewall with the pair of side portions. The tray has an open upper portion defined by an elongate hole formed in the one of the first sidewall and the second sidewall, and adjacent the at least one recess.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
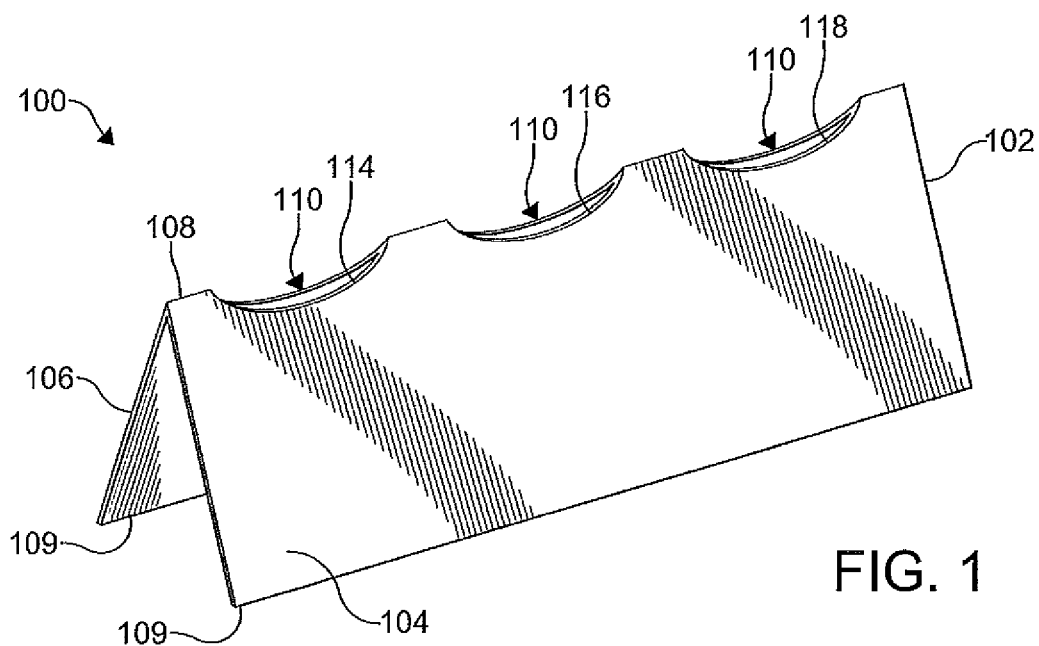
FIG. 1 is a perspective view of a utensil rest according to one embodiment of the present disclosure.

The following description is merely exemplary in nature and is not intended to limit the present disclosure, application, or uses. It should be understood that throughout the drawings, corresponding reference numerals also indicate like or corresponding parts and features.

A utensil rest 100 according to one embodiment of the disclosure is illustrated in FIGS. 1-6. The utensil rest 100 includes a main body 102 having a first sidewall 104 and a second sidewall 106. The first sidewall 104 and the second sidewall 106 are connected and define an edge 108 of the main body 102. Each of the first sidewall 104 and the second sidewall 106 may also have a free base 109 that is disposed opposite ends of the first sidewall 104 and the second sidewall 106 that are connected at the edge 108.

A major surface of at least one of the first sidewall 104 and the second sidewall 106 may provide a suitable location for an advertisement (not shown). As nonlimiting examples, the advertisement may be printed, molded, or machined onto the major surface. Other means for placing the advertisement on at least one of the first sidewall 104 and the second sidewall 106 may also be used within the scope of the disclosure.

Figure 2:
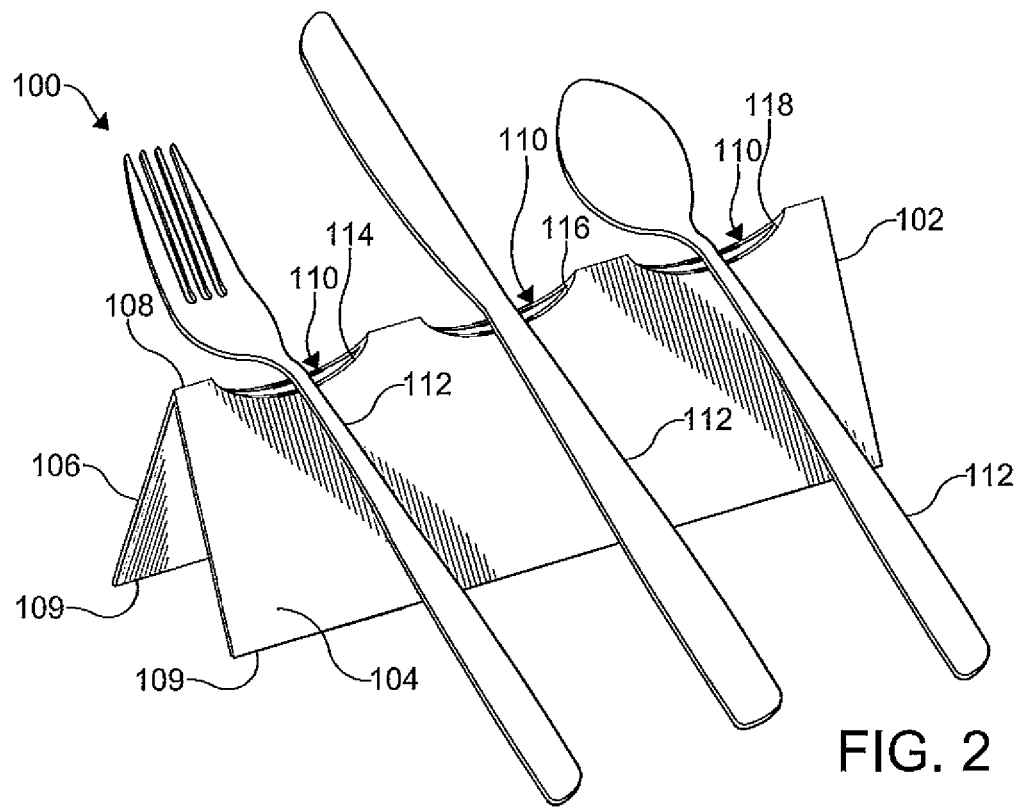
FIG. 2 is a perspective view of the utensil rest shown in FIG. 1, and further showing the utensil rest supporting utensils.

At least one of the first sidewall 104 and the second sidewall 106 have at least one utensil receiving portion 110 formed therein. As shown in FIG. 2, the utensil rest 100 is configured to support a utensil 112 such as a fork, a knife, and a spoon. Other types of utensils 112 such as chopsticks may also be supported by the utensil rest 100, as desired.

As shown in FIGS. 1-6, the at least one utensil receiving portion 110 may be defined by an at least one aperture 114, 116, 118 formed in the edge 108. For example, the at least one aperture 114, 116, 118 may include a first aperture 114, a second aperture 116, and a third aperture 118. The first aperture 114, the second aperture 116, and the third aperture 118 may be spaced apart along the edge 108 of the main body 102. As such, the first aperture 114, the second aperture 116, and the third aperture 118 may accommodate three different utensils 112. Additional apertures may also be provided within the scope of the disclosure, for accommodation of additional utensils.

Figure 3:
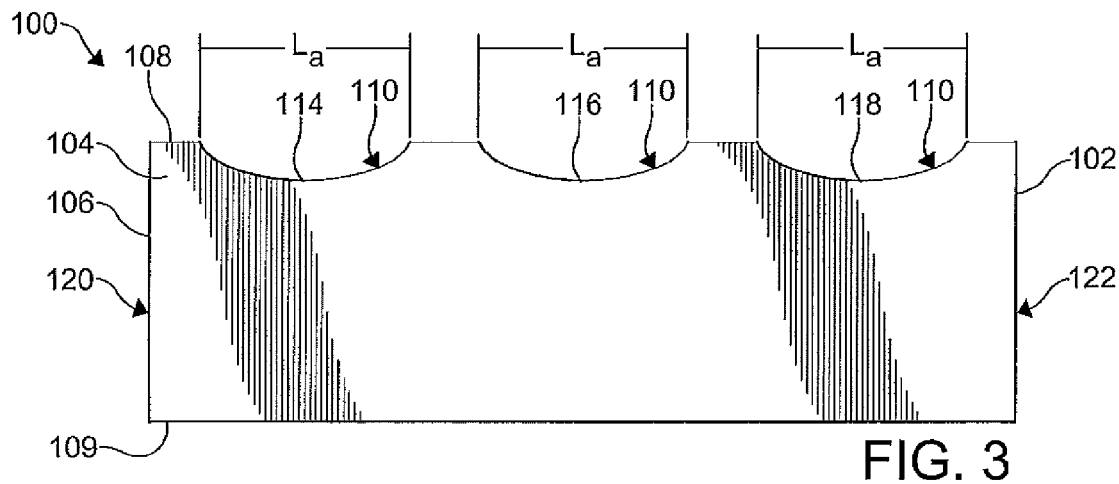
FIG. 3 is a front elevational view of the utensil rest shown in FIG. 1.
Figure 4:
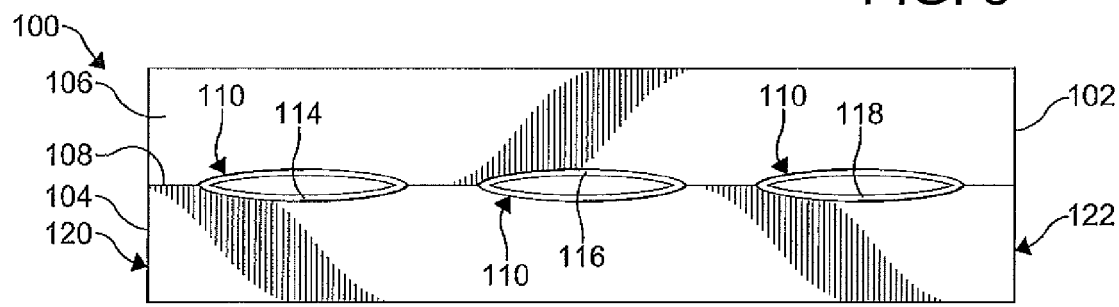
FIG. 4 is a top plan view of the utensil rest shown in FIG. 1.
Figure 5:
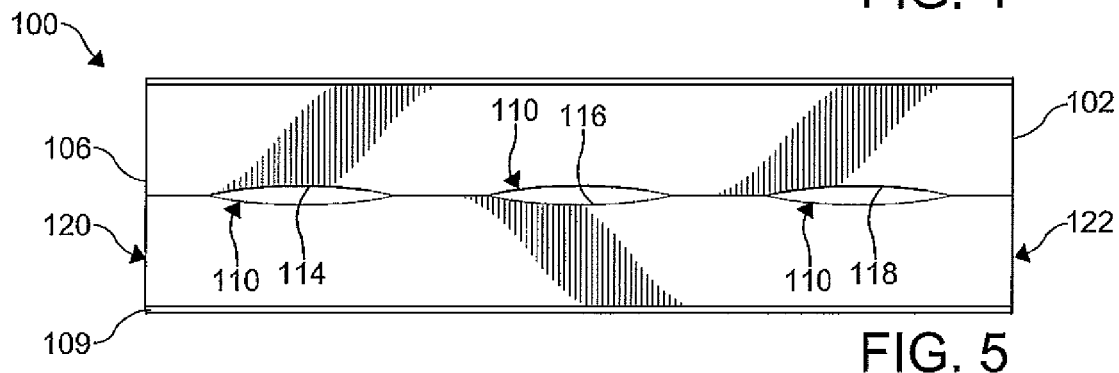
FIG. 5 is a bottom plan view of the utensil rest shown in FIG. 1.

In a particular embodiment, the second aperture 116 is disposed between the first aperture 114 and the third aperture 118. With reference to FIG. 3, each of the first aperture 114, the second aperture 116, and the third aperture 118 may have substantially a same aperture length (La). In other embodiments, the first aperture 114 and the third aperture 118 may have a length that is different from a length of the second aperture 116. One of ordinary skill in the art may select suitable lengths for each of the apertures 114, 116, 118, as desired.

It should also be appreciated that a skilled artisan may select suitable shapes for the at least one aperture 114, 116, 118. As nonlimiting examples, the at least one aperture 114, 116, 118 may be one of substantially oval, substantially circular, substantially square, substantially rectangular, and substantially diamond-shaped in shape. Other shapes may also be employed within the scope of the present disclosure.

Each of the first sidewall 104 and the second sidewall 106 of the utensil rest 100 has a first side 120 and a second side 122. As shown in FIGS. 1-5, the first side 120 and the second side 122 may be substantially straight. In certain embodiments, the first side 120 and the second side 122 may be curvilinear. A skilled artisan may select other shapes for the first side 120 and the second side 122 of the first and sidewalls 104, 106, as desired.

Figure 6:
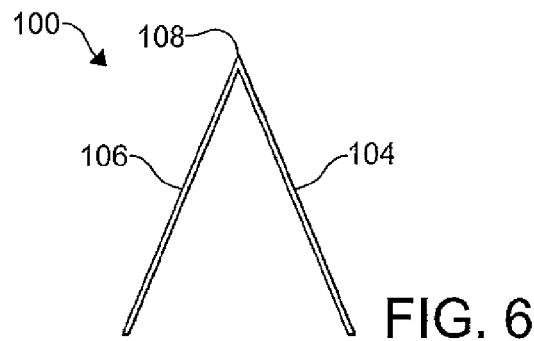
FIG. 6 is a side elevational view of the utensil rest shown in FIG. 1.
Figure 7:
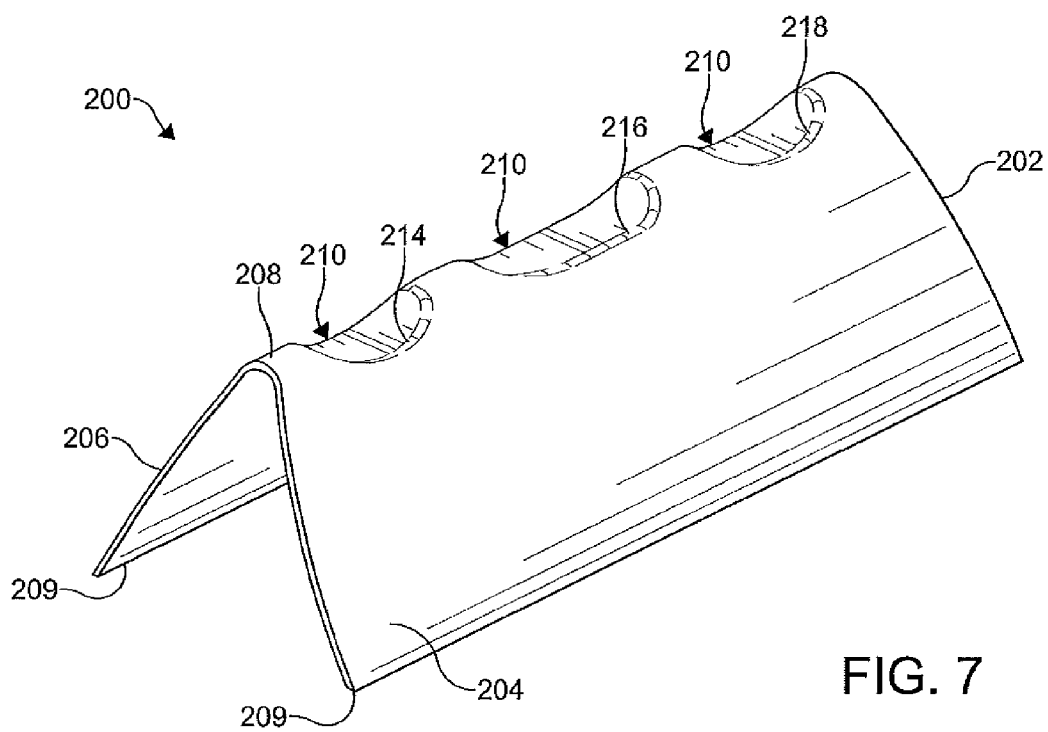
FIG. 7 is a perspective view of a utensil rest according to another embodiment of the present disclosure.

With reference to FIG. 6, it should also be appreciated that the main body 102 of the utensil rest 100 may be substantially V-shaped or tent-shaped. For example, as shown in FIGS. 1-6, the upper edge 108 of the main body 102 may be acute, or may be curvilinear, as desired.

In other embodiments, not shown, the utensil rest 100 may have a base wall that is connected to both the first sidewall 104 and the second sidewall 106. The base wall may include a first portion and a second portion. The first portion may be connected to the base 109 of the first sidewall 104, and the second portion may be connected to the base 109 of the second sidewall 106. The first portion and the second portion may be connected by a clasp. The base wall stabilizes and facilitates a maintaining of the utensil rest 100 in an upright position even when the utensils 112 are supported by the utensil rest 100.

In FIGS. 7-26, like or related structure to that shown in FIGS. 1-6, and identified in a 100-series, is identified by a same reference number but in a 200-series (FIGS. 7-12), a 300-series (FIGS. 13-19), or a 400-series (FIGS. 20-26).

A utensil rest 200 according to a further embodiment of the disclosure is illustrated in FIGS. 7-12. The utensil rest 200 includes a main body 202 having a first sidewall 204 and a second sidewall 206. The first sidewall 204 and the second sidewall 206 are connected and define an edge 208 of the main body 202. Each of the first sidewall 204 and the second sidewall 206 may also have a free base 209 that is disposed opposite ends of the first sidewall 204 and the second sidewall 206 that are connected at the edge 208.

A major surface of at least one of the first sidewall 204 and the second sidewall 206 may provide a suitable location for an advertisement (not shown). As nonlimiting examples, the advertisement may be printed, molded, or machined onto the major surface. Other means for placing the advertisement on at least one of the first sidewall 204 and the second sidewall 206 may also be used within the scope of the disclosure.

Figure 8:
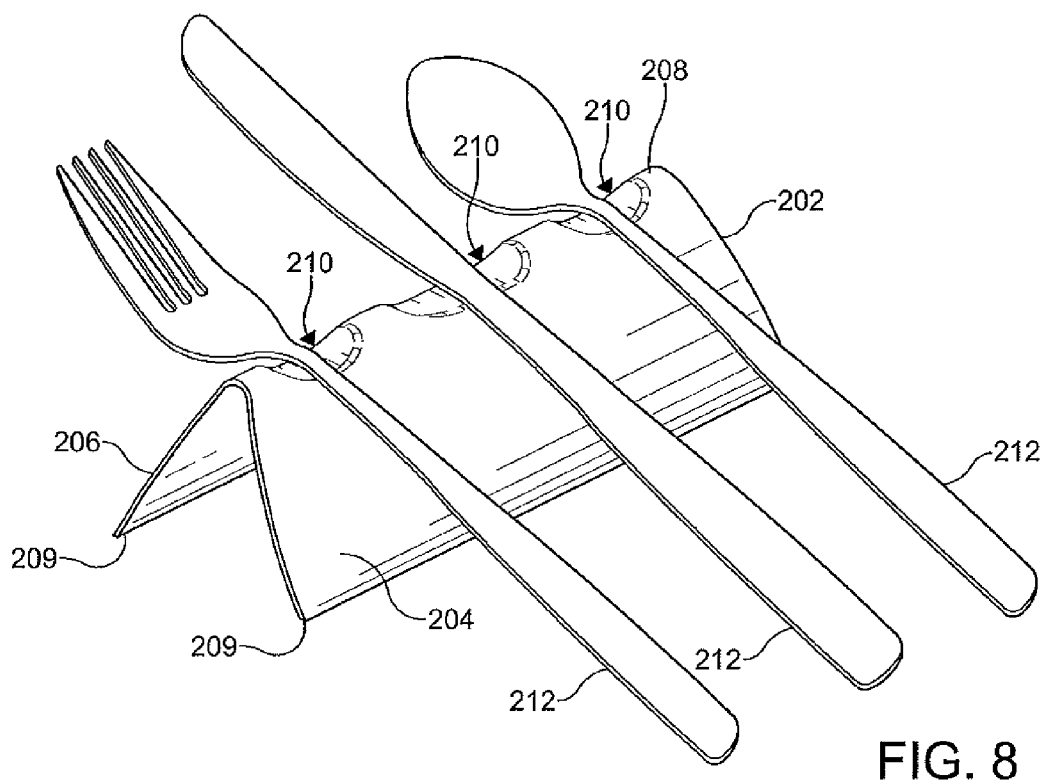
FIG. 8 is a perspective view of the utensil rest shown in FIG. 7, and further showing the utensil rest supporting utensils.
Figure 9:
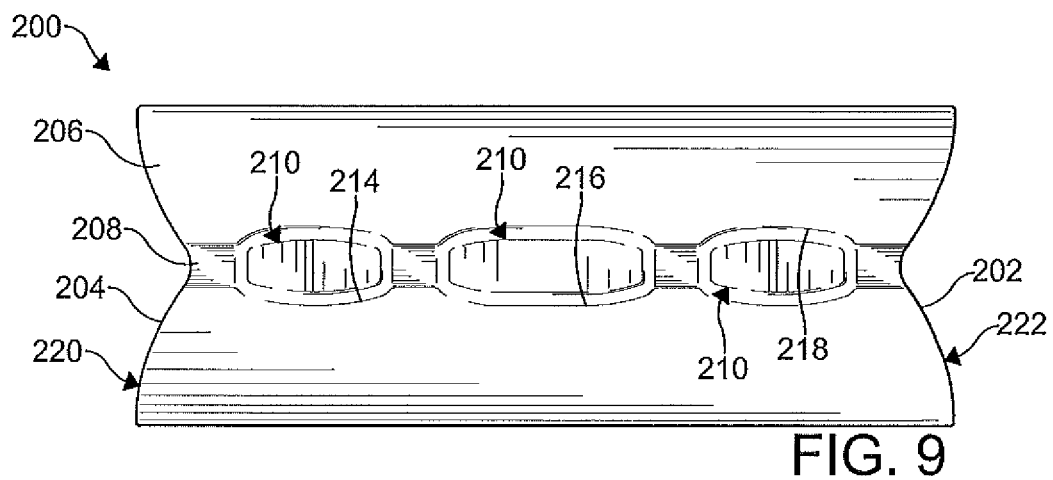
FIG. 9 is a top plan view of the utensil rest shown in FIG. 7.
Figure 10:
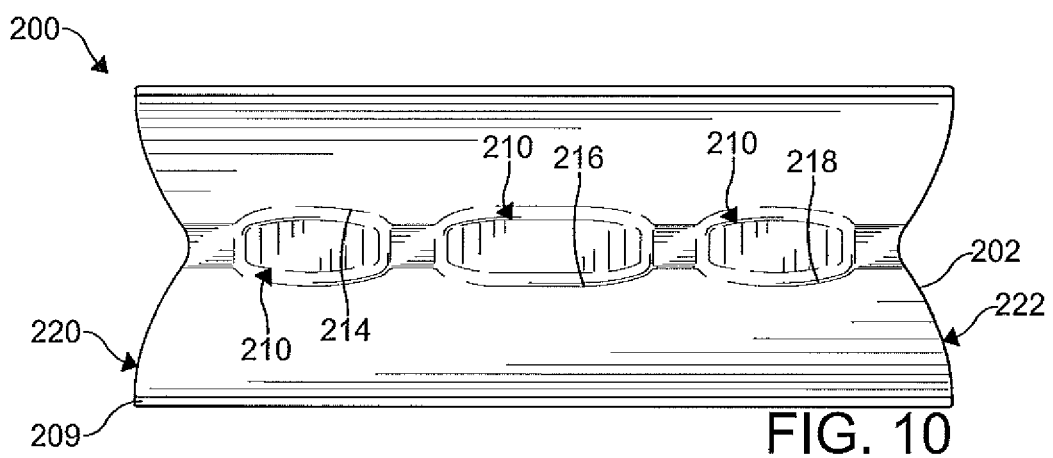
FIG. 10 is a bottom plan view of the utensil rest shown in FIG. 7.

At least one of the first sidewall 204 and the second sidewall 206 have at least one utensil receiving portion 210 formed therein. As shown in FIG. 8, the utensil rest 200 is configured to support a utensil 212 such as a fork, a knife, and a spoon. Other types of utensils 212 such as chopsticks may also be supported by the utensil rest 200, as desired.

As shown in FIGS. 7-12, the at least one utensil receiving portion 210 of the utensil rest 220 may be defined by an at least one recess 214, 216, 218. For example, the at least one recess 214, 216, 218 may include a first recess 214, a second recess 216, and a third recess 218. The first recess 214, the second recess 216, and the third recess 218 are spaced apart along the edge 208 of the main body 202.

Figure 11:
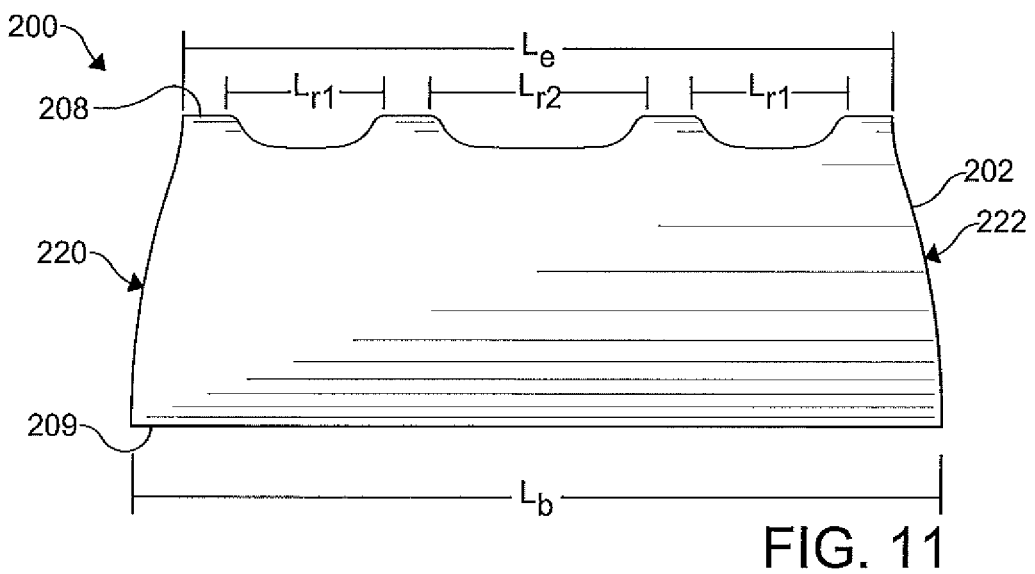
FIG. 11 is a front elevational view of the utensil rest shown in FIG. 7.

In a particular embodiment, the second recess 216 is disposed between the first recess 214 and the third recess 218. With reference to FIG. 11, the first recess 214 and the third recess 218 may have a first recess length (Lr1). The second aperture 216 may have a second recess length (Lr2). The second recess length (Lr2) may be greater than the first recess length (Lr1). It should be appreciated that the greater second recess length (Lr2) may be particularly advantageous for the supporting of a broad utensil 212 such as a knife near a center of the utensil rest 200.

The base 209 of each of the first sidewall 204 and the second sidewall 206 may have a base length (Lb). The opposing edge 208 of the main body 202 may also have an edge length (Le). In a particularly illustrative embodiment, the base length (Lb) is greater than the edge length (Le). One of ordinary skill in the art should understand that this different in relative length of the base length (Lb) and the edge length (Le) facilitates to a greater stability of the utensil rest 200 in operation, where the utensils 212 are supported by the utensil rest 200.

With further reference to FIG. 11, each of the first sidewall 204 and the second sidewall 206 of the utensil rest 200 also has a first side 220 and a second side 222. As shown in FIGS. 7-11, the first side 220 and the second side 222 may be curvilinear, for example, substantially serpentine in shape. In other embodiments, the first side 220 and the second side 222 may be straight. Other shapes for the first side 220 and the second side 222 of the first and second sidewalls 204, 206 may also be employed within the scope of the disclosure.

Figure 12:
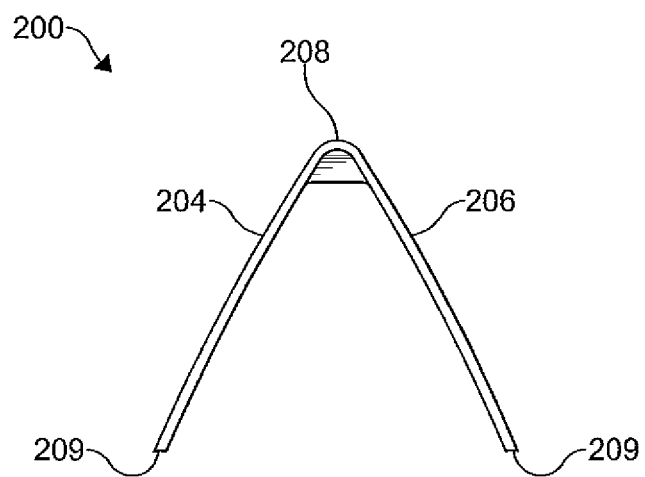
FIG. 12 is a side elevational view of the utensil rest shown in FIG. 7.

With reference to FIG. 12, it should also be appreciated that the main body 202 of the utensil rest 200 may be substantially V-shaped or tent-shaped. For example, as shown in FIGS. 7-12, the upper edge 208 of the main body 202 may be curvilinear, or may be acute, as desired.

A utensil rest 300 according to another embodiment of the disclosure is illustrated in FIGS. 13-19. The utensil rest 300 includes a main body 302 having a first sidewall 304 and a second sidewall 306. The first sidewall 304 and the second sidewall 306 are connected and define an edge 308 of the main body 302. Each of the first sidewall 304 and the second sidewall 306 may also have a free base 309 that is disposed opposite ends of the first sidewall 304 and the second sidewall 306 that are connected at the edge 308.

A major surface of at least one of the first sidewall 304 and the second sidewall 306 may provide a suitable location for an advertisement (not shown). As nonlimiting examples, the advertisement may be printed, molded, or machined onto the major surface. Other means for placing the advertisement on at least one of the first sidewall 304 and the second sidewall 306 may also be used within the scope of the disclosure.

Figure 14:
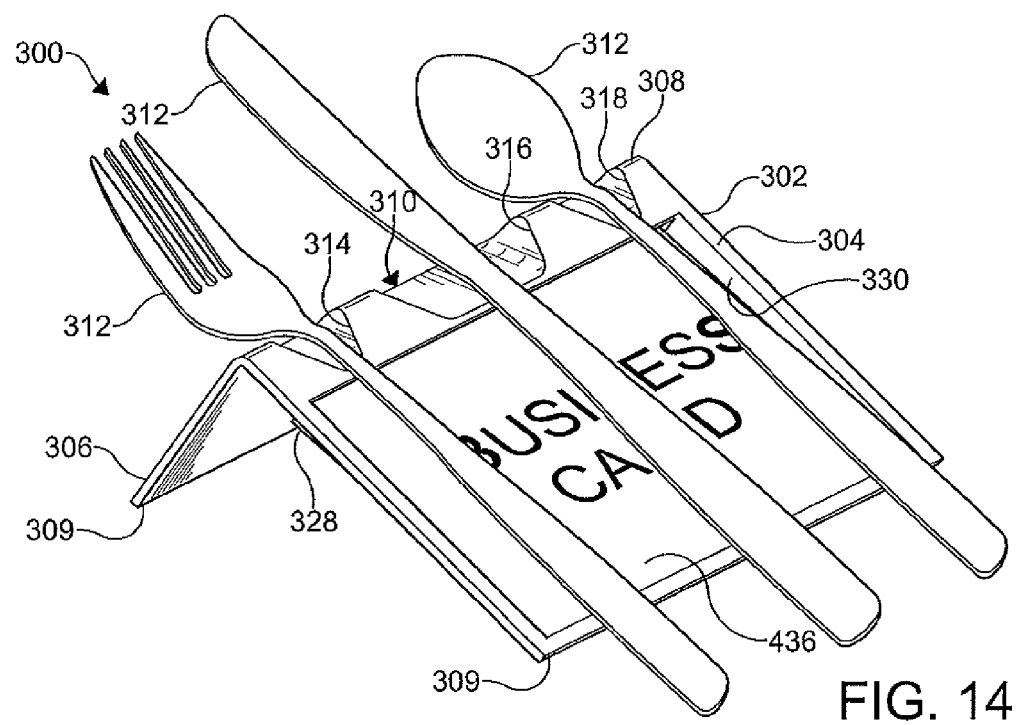
FIG. 14 is a perspective view of the utensil rest shown in FIG. 13, and further showing the utensil rest supporting utensils and holding a business card.

At least one of the first sidewall 304 and the second sidewall 306 have at least one utensil receiving portion 310 formed therein. As shown in FIG. 14, the utensil rest 300 is configured to support a utensil 312 such as a fork, a knife, and a spoon. Other types of utensils 312 such as chopsticks may also be supported by the utensil rest 300, as desired.

As shown in FIGS. 13-19, the at least one utensil receiving portion 310 of the utensil rest 300 may be defined by an at least one recess 314, 316, 318. For example, the at least one recess 314, 316, 318 may include a first recess 314, a second recess 316, and a third recess 318. The first recess 314, the second recess 316, and the third recess 318 are spaced apart along the edge 308 of the main body 302.

Figure 15:
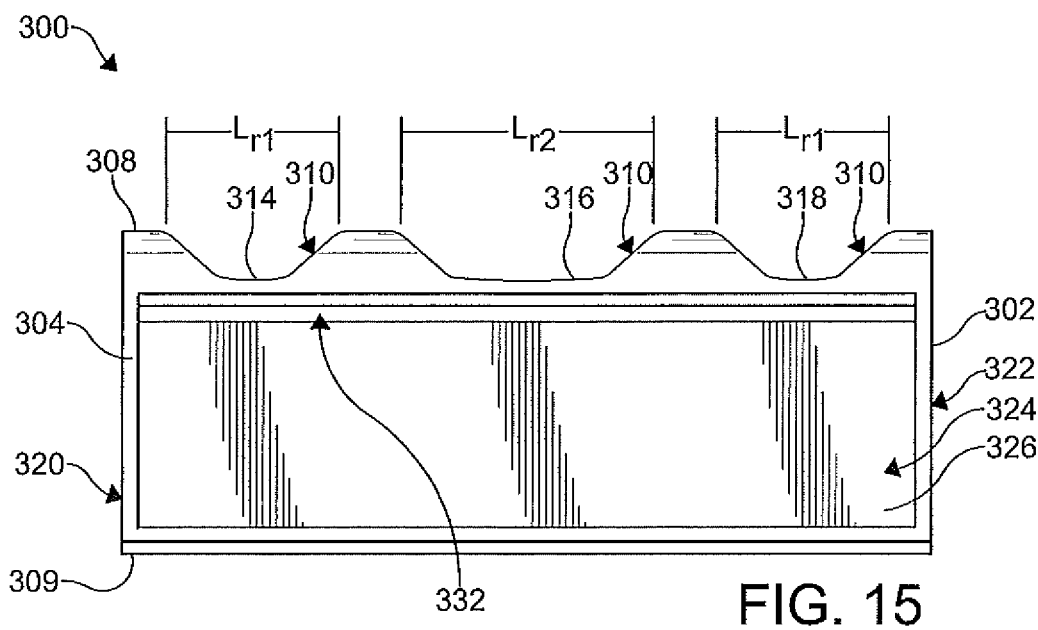
FIG. 15 is a front elevational view of the utensil rest shown in FIG. 13.
Figure 16:
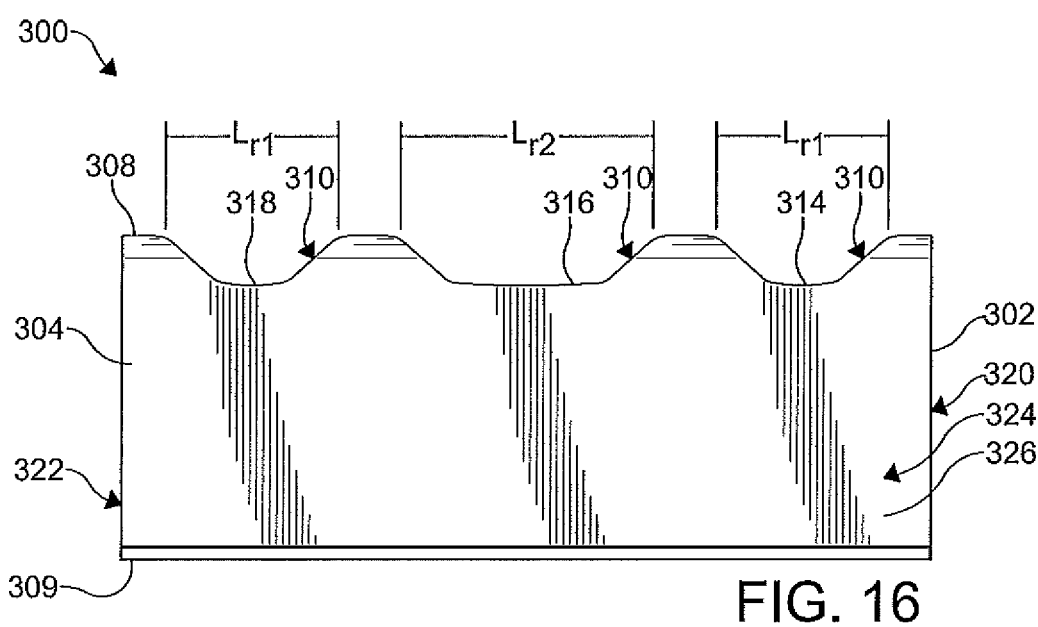
FIG. 16 is a rear elevational view of the utensil rest shown in FIG. 13.
Figure 17:
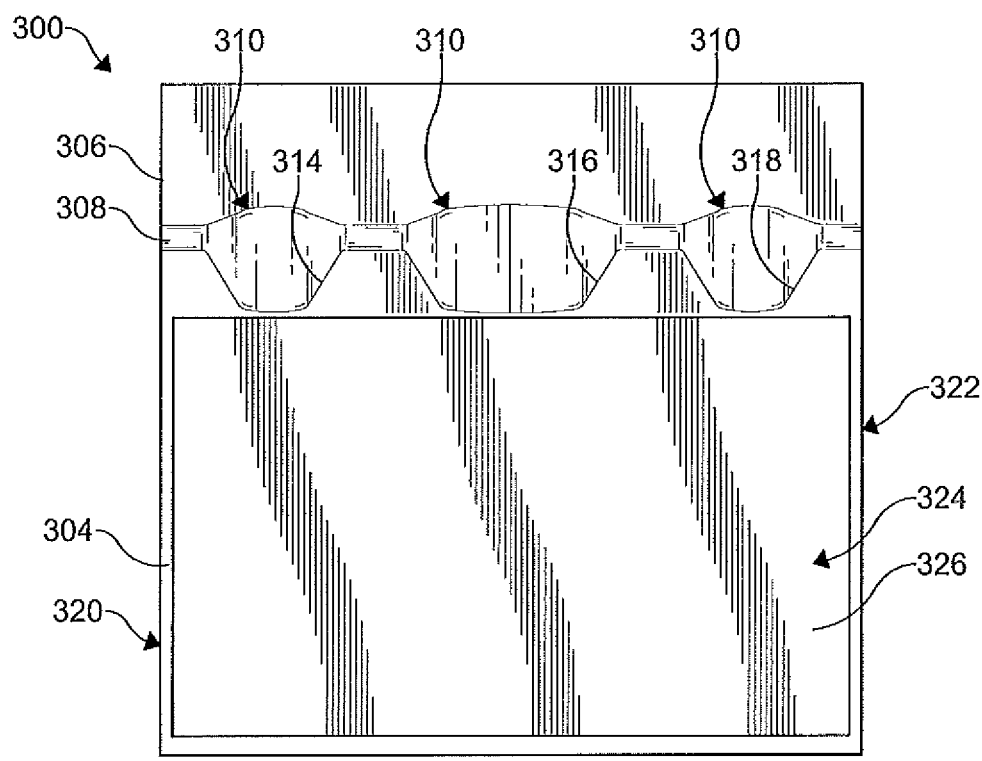
FIG. 17 is a top plan view of the utensil rest shown in FIG. 13.
Figure 18:
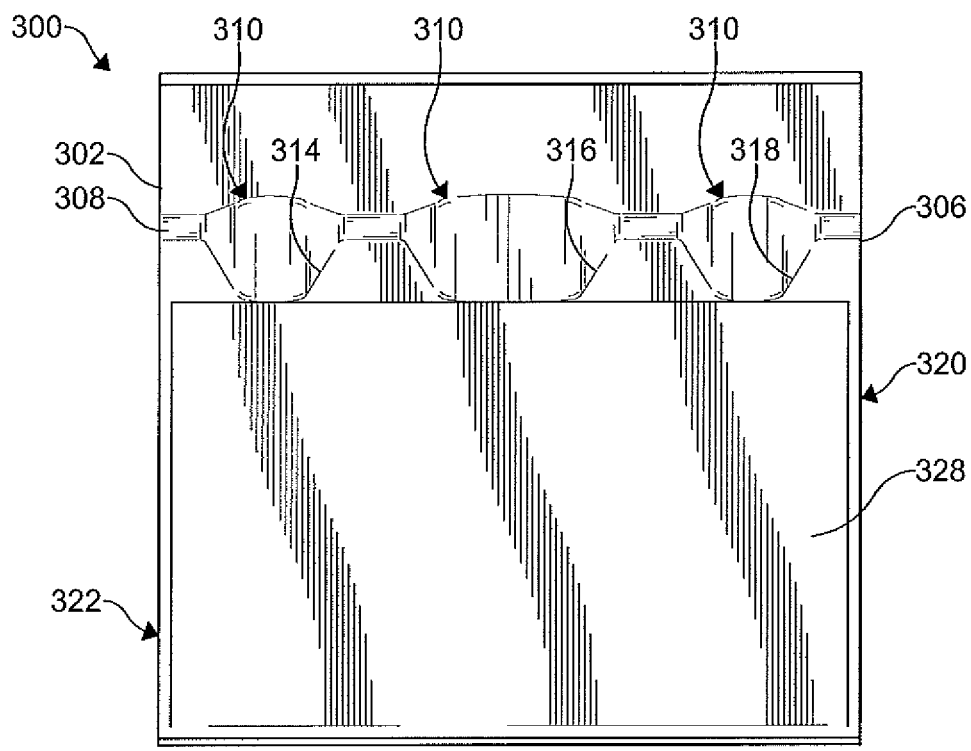
FIG. 18 is a bottom plan view of the utensil rest shown in FIG. 13.

In a particular embodiment, the second recess 316 is disposed between the first recess 314 and the third recess 318. With reference to FIG. 15, the first recess 314 and the third recess 318 may have the first recess length (Lr1). The second aperture 316 may have the second recess length (Lr2). The second recess length (Lr2) may be greater than the first recess length (Lr1). It should be appreciated that the greater second recess length (Lr2) may be particularly advantageous for the supporting of a broad utensil 312 such as a knife near a center of the utensil rest 300.

With further reference to FIG. 15, each of the first sidewall 304 and the second sidewall 306 of the utensil rest 300 also has a first side 320 and a second side 322. As shown in FIGS. 13-18, the first side 320 and the second side 322 may be straight. In other embodiments, the first side 320 and the second side 322 may be curvilinear. Other shapes for the first side 320 and the second side 322 of the first and second sidewalls 304, 306 may also be employed within the scope of the disclosure.

Figure 19:
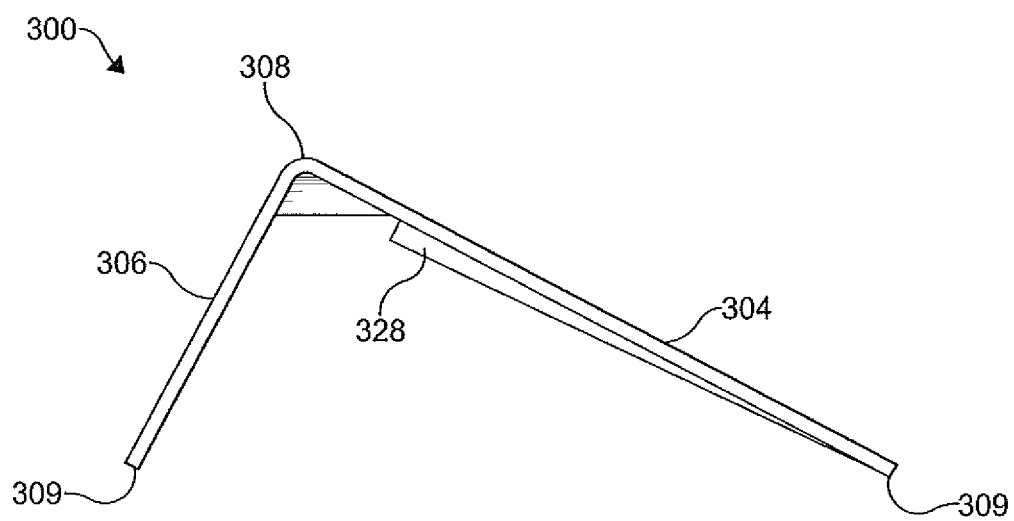
FIG. 19 is a side elevational view of the utensil rest shown in FIG. 13.
Figure 20:
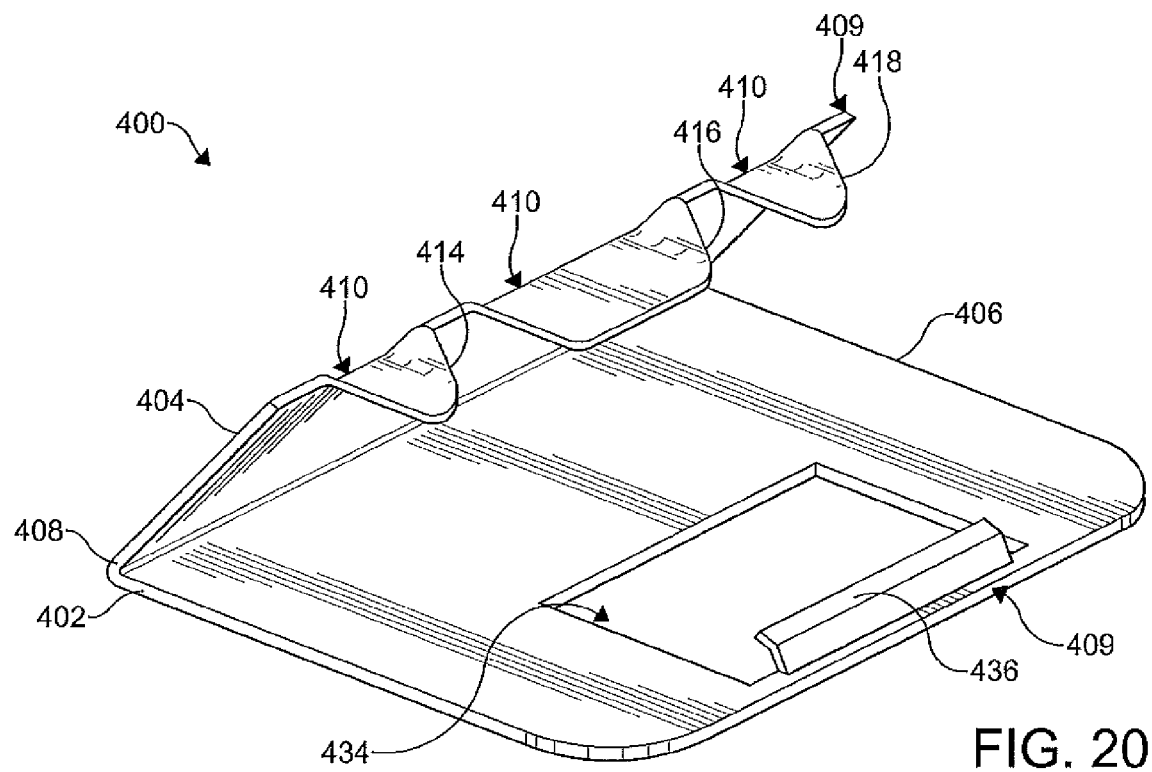
FIG. 20 is a perspective view of a utensil rest according to an additional embodiment of the present disclosure.

With reference to FIG. 19, it should also be appreciated that the main body 302 of the utensil rest 300 may be substantially V-shaped or tent-shaped. For example, as shown in FIGS. 13-19, the upper edge 308 of the main body 302 may be curvilinear, or may be acute, as desired.

Advantageously, the utensil rest 300 shown in FIGS. 13-19 has a tray 324. The tray 324 is configured to hold an advertisement such as a business card 325, for example, as depicted in FIG. 14. Other forms of advertisements may also be held by the tray 324, as desired. The tray 324 is formed in one of the first sidewall 304 and the second sidewall 306.

Figure 13:
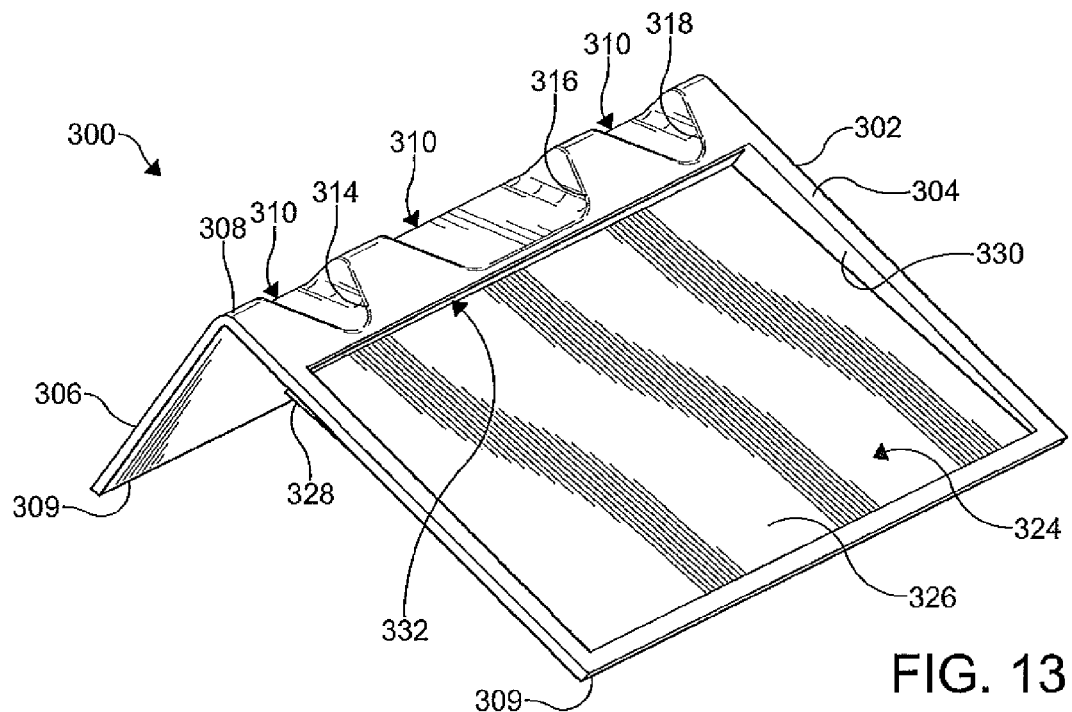
FIG. 13 is a perspective view of a utensil rest according to a further embodiment of the present disclosure.

Referring to FIGS. 13-14 and 19, the tray 324 may include a bottom portion 326 and a pair of side portions 328, 330. The bottom portion 326 is connected to the one of the first sidewall 304 and the second sidewall 306 with the pair of side portions 328, 330. The tray 324 may further have an open upper portion 332. The open upper portion 332 is defined by an elongate hole formed in the one of the first sidewall 304 and the second sidewall 306. In particular, the elongate hole is formed in the one of the first sidewall 304 and the second sidewall 306 adjacent the at least one utensil receiving portion 310. The open upper portion 332 advantageously permits the insertion of the business card 325 into the tray 324. Where the business card 325 has a greater surface area than a surface area of the tray 324, a securing of the business card 325 in the utensil rest 300 is facilitated by a disposition of an end of the business card through the elongate hole.

As further illustrated in FIGS. 13-19, the first sidewall 304 may be provided with a greater breadth than a breadth of the second sidewall 306. The difference in breadth advantageously facilitates the formation of the tray 324 in the first sidewall 304 instead of the second sidewall 306.

A utensil rest 400 according to an additional embodiment of the disclosure is illustrated in FIGS. 20-26. The utensil rest 400 includes a main body 402 having a first sidewall 404 and a second sidewall 406. The first sidewall 404 and the second sidewall 406 are connected and define an edge 408 of the main body 402. Each of the first sidewall 304 and the second sidewall 306 may also have a free base 409 that is disposed opposite ends of the first sidewall 404 and the second sidewall 406 that are connected at the edge 408.

A major surface of at least one of the first sidewall 404 and the second sidewall 406 may provide a suitable location for an advertisement (not shown). As nonlimiting examples, the advertisement may be printed, molded, or machined onto the major surface. Other means for placing the advertisement on at least one of the first sidewall 404 and the second sidewall 406 may also be used within the scope of the disclosure.

Figure 21:
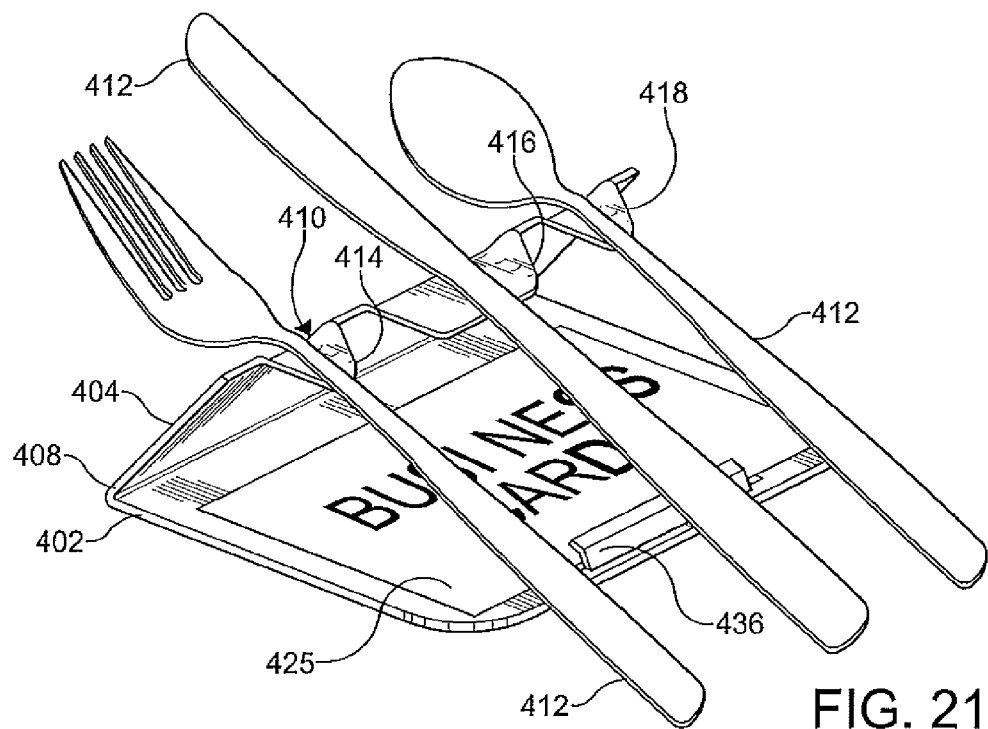
FIG. 21 is a perspective view of the utensil rest shown in FIG. 20, and further showing the utensil rest supporting utensils and holding a business card.

As shown in FIGS. 20-26, at least one utensil receiving portion 410 formed is formed at the free base 409 of one the first sidewall 404 and the second sidewall 406. The utensil rest 300 is configured to support a utensil 412 such as a fork, a knife, and a spoon, for example, as shown in FIG. 21. Other types of utensils 412 such as chopsticks may also be supported by the utensil rest 400, as desired.

The at least one utensil receiving portion 410 of the utensil rest 400 may be defined by an at least one recess 414, 416, 418. For example, the at least one recess 414, 416, 418 may include a first recess 414, a second recess 416, and a third recess 418. The first recess 414, the second recess 416, and the third recess 418 are spaced apart along the base 409 of the one the first sidewall 404 and the second sidewall 406.

Figure 22:
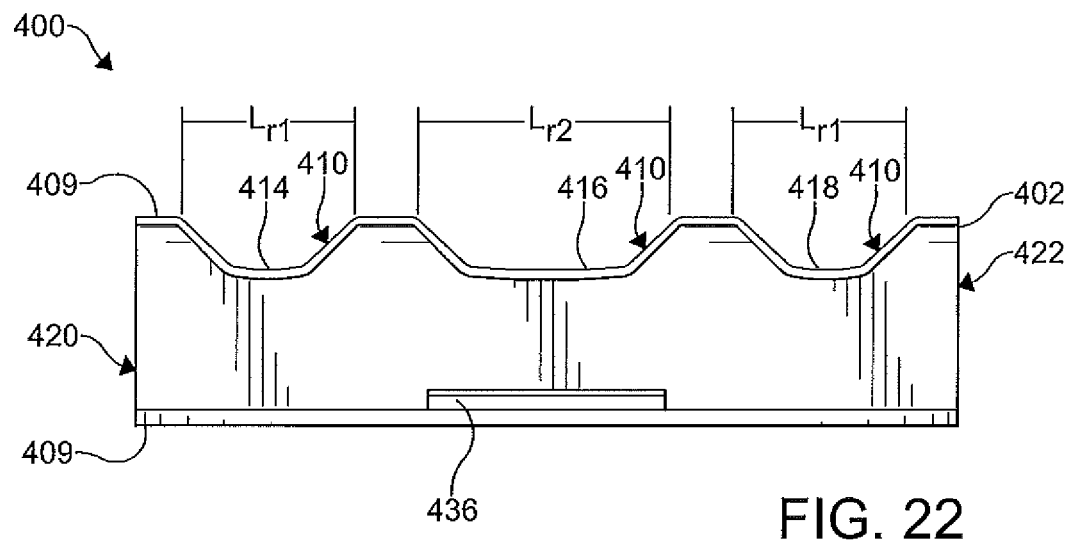
FIG. 22 is a front elevational view of the utensil rest shown in FIG. 20.
Figure 23:
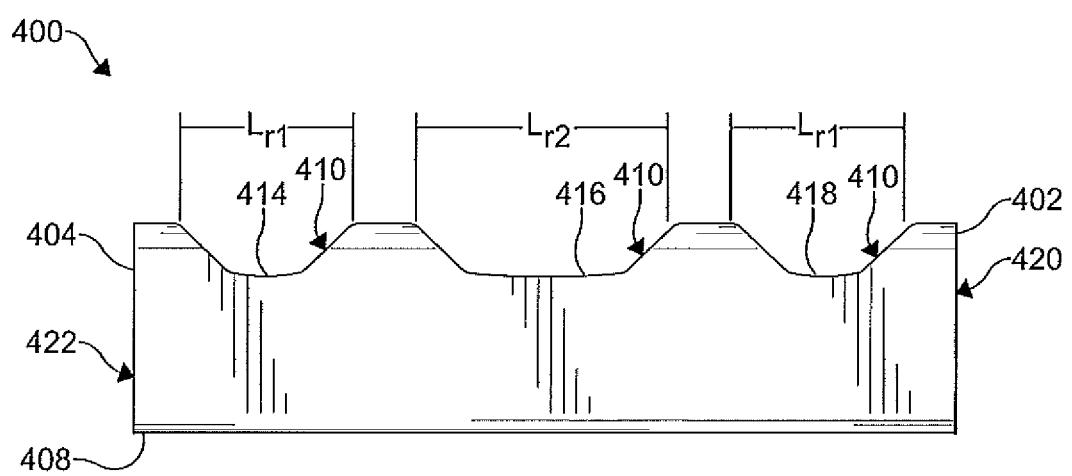
FIG. 23 is a rear elevational view of the utensil rest shown in FIG. 20.
Figure 24:
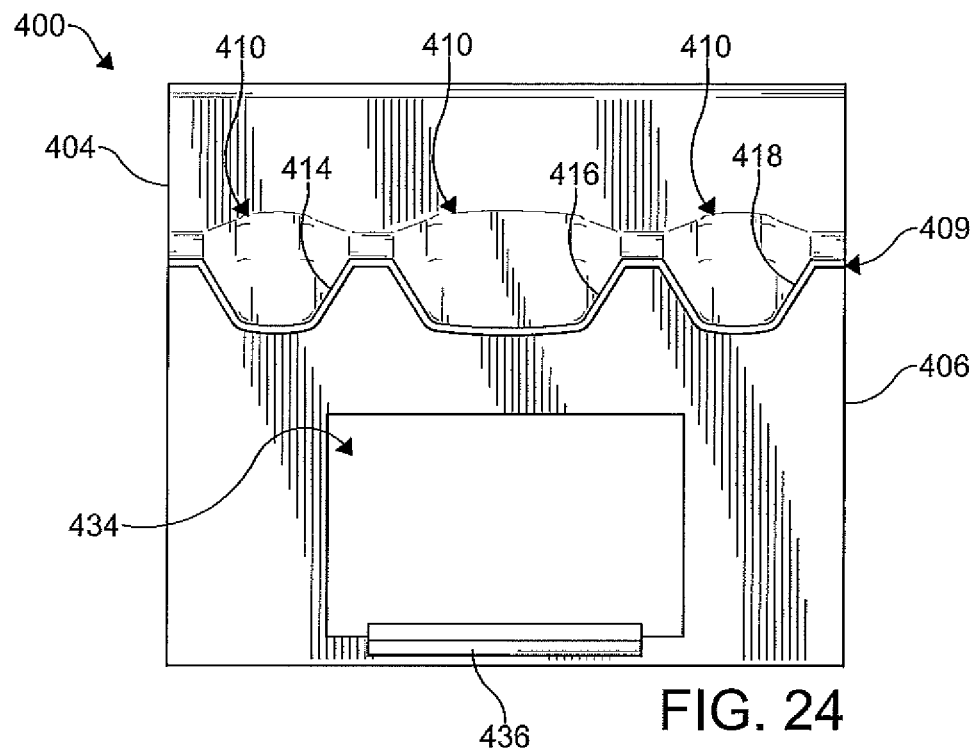
FIG. 24 is a top plan view of the utensil rest shown in FIG. 20.
Figure 25:
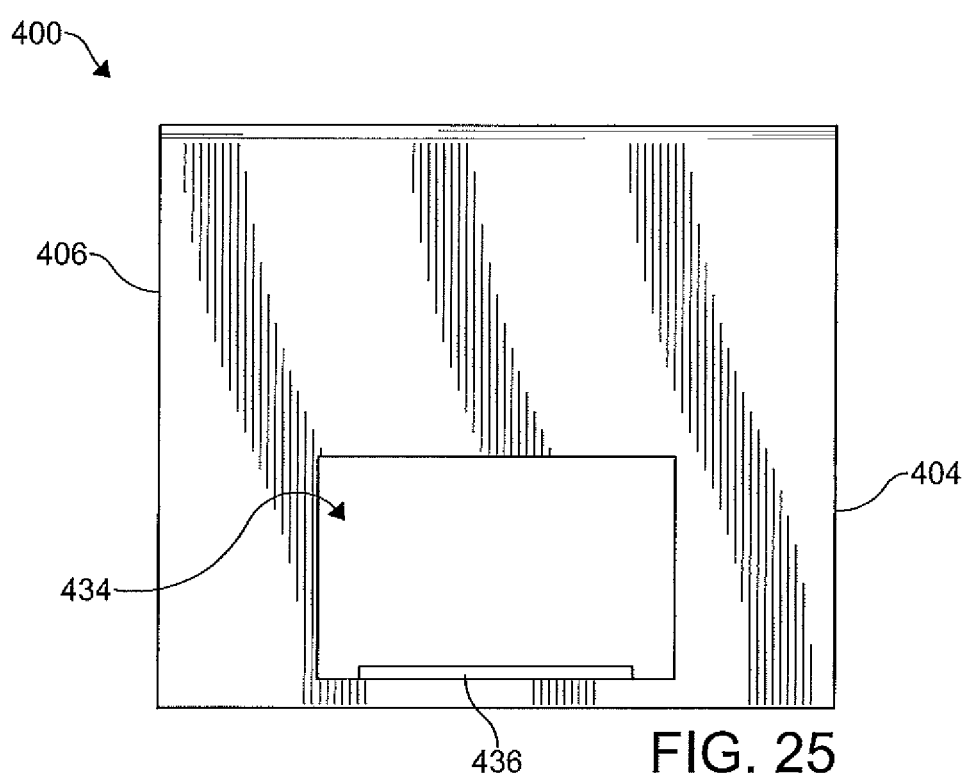
FIG. 25 is a bottom plan view of the utensil rest shown in FIG. 20.

In a particular embodiment, the second recess 416 is disposed between the first recess 414 and the third recess 418. With reference to FIG. 22, the first recess 414 and the third recess 418 may have the first recess length (Lr1). The second aperture 416 may have the second recess length (Lr2). The second recess length (Lr2) may be greater than the first recess length (Lr1). It should be appreciated that the greater second recess length (Lr2) may be particularly advantageous for the supporting of a broad utensil 412 such as a knife near a center of the utensil rest 400.

With further reference to FIG. 22, each of the first sidewall 404 and the second sidewall 406 of the utensil rest 400 also has a first side 420 and a second side 422. As shown in FIGS. 13-18, the first side 420 and the second side 422 may be straight. In other embodiments, the first side 420 and the second side 422 may be curvilinear. Other shapes for the first side 420 and the second side 422 of the first and second sidewalls 404, 406 may also be employed within the scope of the disclosure.

Figure 26:
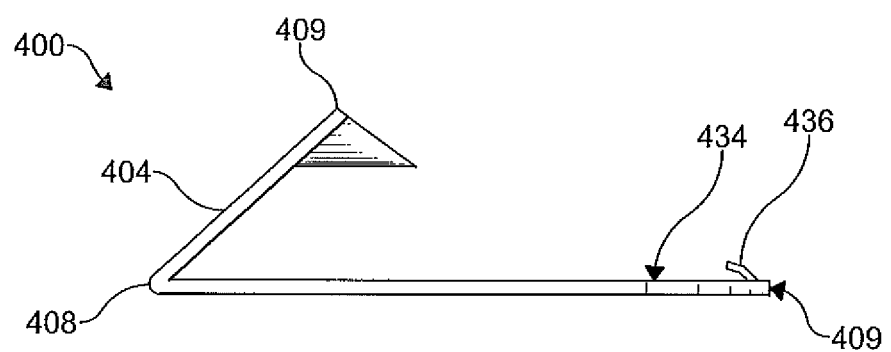
FIG. 26 is a side elevational view of the utensil rest shown in FIG. 20.

With reference to FIG. 26, it should also be appreciated that the main body 402 of the utensil rest 400 may be substantially V-shaped or tent-shaped. However, as opposed to the other embodiments described hereinabove, the main body 402 may lay on a major surface of one of the first sidewall 404 and the second sidewall 406 instead of one the base 409 of each of the first and second sidewalls 404, 406. For example, the edge 308 of the main body 302 may also be curvilinear, as shown in FIGS. 20-26, or may be acute, as desired.

In particular, one of the first sidewall 404 and the second sidewall 406 has an opening 434 formed therein. A card holding clip 436 is formed adjacent the opening 434. Advantageously, the card holding clip 436 secures a business card 425, for example, as shown in FIG. 21. Furthermore, the placement of the opening 434 adjacent the card holding clip 436 permits one to insert a finger into the opening 434 and readily remove the business card 425 from the utensil rest 400.

It should be understood that the utensil rest 100, 200, 300, 400 of the present disclosure may be disposable. For example, the utensil rest 100, 200, 300, 400 may be provided in a package together with at least one of disposable utensils 112, 212, 312, 412 and a napkin. The utensil rest 100, 200, 300, 400 supports the utensils 112, 212, 312, 412 from direct contact with an eating surface such as a table, table cloth or placemat surface. Thus, the utensil rest 100, 200, 300, 400 facilitates a sanitary eating experience for a user of the utensil rest 100, 200, 300, 400.

Advantageously, the utensil rest 100, 200, 300, 400 has a substantially constant thickness at any point thereof. The utensil rest 100, 200, 300, 400 is formed from a material providing sufficient stiffness for the utensil rest 100, 200, 300, 400 to support the utensils 112, 212, 312, 412. As nonlimiting examples, the utensil rest 100, 200, 300, 400 may be formed from any suitable material including plastic, paper, cardboard-like material, acrylic, glass, crystal, ceramic, brass, foil, and clay. The utensil rest may be approximately 3½" long by 1" tall, as nonlimiting examples. Other materials and dimensions may also be employed, as desired While certain representative embodiments and details have been shown for purposes of illustrating the invention, it will be apparent to those skilled in the art that various changes may be made without departing from the scope of the disclosure, which is further described in the following appended claims.

What is claimed is:

1. A utensil rest, comprising:
a main body having a first sidewall and a second sidewall, the first sidewall and the second sidewall connected and defining an apex edge of the main body, each of the first sidewall and the second sidewall having a free base that is disposed opposite the apex edge, and each of the first sidewall and the second sidewall having a first side and a second side extending between the apex edge and the free base, the first sidewall and the second sidewall having a plurality of utensil receiving portions formed therein and configured to support utensils,
wherein the first sidewall has a tray disposed between the first side and the second side of the first sidewall and between the free base of the first sidewall and the apex edge of the main body, the tray including at least one side portion and a bottom portion, the at least one side portion disposed laterally inwardly from one of the first side and the second side of the first sidewall, the at least one side portion connected to and extending away from the first sidewall, the bottom portion disposed at least partly beneath the first sidewall and connected to the at least one side portion, the at least one side portion and the bottom portion defining a space configured to hold an advertisement in the first sidewall,
wherein the plurality of utensil receiving portions include a first recess and a second recess spaced apart along the apex edge of the main body, the first sidewall, and the second sidewall, each of the first recess and the second recess having a closed bottom and arranged entirely between the first side and the second side of each of the first sidewall and the second sidewall, the first recess having a first recess length that permits the first recess to receive a narrow utensil, the second recess having a second recess length that permits the second recess to receive a broad utensil, the second recess length greater than the first recess length.

2. The utensil rest of claim 1, wherein the main body is substantially V-shaped.

3. The utensil rest of claim 1, wherein a length of the first sidewall is greater than a length of the second sidewall.

4. The utensil rest of claim 1, wherein the first sidewall is oriented substantially orthogonal with the second sidewall.

5. The utensil rest of claim 1, wherein the apex edge of the main body is rounded.

6. The utensil rest of claim 1, wherein the plurality of utensil receiving portions includes a third recess on the apex edge of the main body, the second recess disposed between the first recess and the third recess, the third recess also having the first recess length.

* * * * *